(12) United States Patent
Cheng et al.

(10) Patent No.: US 11,028,207 B2
(45) Date of Patent: Jun. 8, 2021

(54) FLAME RETARDANT POLYOLEFIN-TYPE RESIN AND PREPARATION METHOD AS WELL AS OPTIC FIBER CABLE USING THE SAME

(71) Applicant: CORNING INCORPORATED, Corning, NY (US)

(72) Inventors: Xiaole Cheng, Painted Post, NY (US); Dayue Jiang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 54 days.

(21) Appl. No.: 16/394,556

(22) Filed: Apr. 25, 2019

(65) Prior Publication Data
US 2019/0248943 A1    Aug. 15, 2019

Related U.S. Application Data

(63) Continuation of application No. PCT/US2017/055725, filed on Oct. 9, 2017.

(60) Provisional application No. 62/412,953, filed on Oct. 26, 2016.

(51) Int. Cl.
| | |
|---|---|
| C08F 255/02 | (2006.01) |
| C08L 51/06 | (2006.01) |
| C08F 222/06 | (2006.01) |
| C08F 210/02 | (2006.01) |
| C08F 220/32 | (2006.01) |
| C08K 5/524 | (2006.01) |
| C08F 220/18 | (2006.01) |
| C08K 5/18 | (2006.01) |
| C08F 8/32 | (2006.01) |
| C03C 25/18 | (2006.01) |
| H01B 7/00 | (2006.01) |
| C08F 8/40 | (2006.01) |
| C03C 25/106 | (2018.01) |
| G02B 6/44 | (2006.01) |

(52) U.S. Cl.
CPC ........ *C08F 255/026* (2013.01); *C03C 25/106* (2013.01); *C03C 25/18* (2013.01); *C08F 8/32* (2013.01); *C08F 8/40* (2013.01); *C08F 210/02* (2013.01); *C08F 220/18* (2013.01); *C08F 220/32* (2013.01); *C08F 222/06* (2013.01); *C08K 5/18* (2013.01); *C08K 5/524* (2013.01); *C08L 51/06* (2013.01); *G02B 6/4401* (2013.01); *H01B 7/00* (2013.01); *C08F 220/1804* (2020.02); *C08L 2201/02* (2013.01); *C08L 2203/202* (2013.01); *C08L 2203/206* (2013.01); *C08L 2205/16* (2013.01)

(58) Field of Classification Search
CPC ....... C08L 2201/02; H01B 3/441; C08F 8/32; C08F 220/32; C08F 222/06; C08F 220/18
See application file for complete search history.

(56) References Cited

U.S. PATENT DOCUMENTS

| | | | |
|---|---|---|---|
| 4,868,246 A * | 9/1989 | MacLeay | .................. C08F 8/30 525/142 |
| 5,220,015 A | 6/1993 | MacLeay et al. | |
| 2008/0304798 A1 | 12/2008 | Pavan et al. | |
| 2009/0253836 A1 | 10/2009 | Flat et al. | |
| 2011/0198105 A1 | 8/2011 | Shanai et al. | |
| 2011/0251336 A1 | 10/2011 | Tai et al. | |
| 2012/0035315 A1 | 2/2012 | Song | |
| 2014/0213712 A1 | 7/2014 | Bolourchi et al. | |
| 2017/0107375 A1 | 4/2017 | Pfaendner et al. | |

FOREIGN PATENT DOCUMENTS

| | | |
|---|---|---|
| DE | 102014218811 A1 | 3/2016 |
| WO | 2010017554 A1 | 2/2010 |

OTHER PUBLICATIONS

Banks et al; "Influence of Covalently Bound Phosphorus-Containing Groups on the Flammability of Poly(Vinyl Alcohol), Poly(Ethylene-Co-Vinyl Alcohol) and Low-Density Polyethylene"; Polymer, 1993, vol. 34, No. 21; p. 4547-4556.
International Search Report and Written Opinion of the International Searching Authority; PCT/US2017/055725; dated Jan. 17, 2018; 11 Pages; European Patent Office.
Liu et al; "Characteristic Analysis on a Reactive Extrusion Process for the Imidization of Poly(Styrene-Co-Maleic Anhydride) With Aniline"; Chemical Engineering Science; 65 (2010) pp. 1781-1789.
Sonnier et al; "Improving the Flame Retardancy of Flax Fabrics by Radiation Grafting of Phosphorus Compounds"; European Polymer Journal; 68 (2015) pp. 313-325.
Chinese Patent Application No. 201780072094.5, Office Action dated Feb. 24, 2021, 7 pages (English Translation Only); Chinese Patent Office.

\* cited by examiner

*Primary Examiner* — Jeffrey C Mullis
(74) *Attorney, Agent, or Firm* — William D. Doyle

(57) ABSTRACT

A method of preparing a flame retardant grafted polyolefin resin is provided. The method includes a step of reacting in an extrusion barrel a reactive polyolefin and a monomeric flame retardant agent to form the flame retardant grafted polyolefin resin. The reactive polyolefin has a functional group including a moiety selected from the group consisting of anhydrides, epoxies, carboxylic acids, ketones, and isocyanates. The monomeric flame retardant agent has an amine functional group. The method also includes a step of extruding the flame retardant grafted polyolefin resin. Also provided is a flame retardant grafted polyolefin resin that can be made according to the method. Further provided is a flame retardant cable that incorporates can incorporate the flame retardant grafted polyolefin resin.

21 Claims, 3 Drawing Sheets

FLAME RETARDANT POLYOLEFIN-TYPE RESIN AND PREPARATION METHOD AS WELL AS OPTIC FIBER CABLE USING THE SAME

CROSS-REFERENCED TO RELATED APPLICATIONS

This application is a continuation of International Application No. PCT/US17/55725, filed on Oct. 9, 2017, which claims the benefit of priority to U.S. Application No. 62/412,953, filed on Oct. 26, 2016, both applications being incorporated herein by reference.

BACKGROUND

The disclosure relates generally to flame retardant compounds and more particularly to a thermoplastic flame retardant compound. Flame retardant materials are used to protect combustible materials, such as plastics or wood, from fire damage and heat. Additionally, flame retardant materials have been used to protect materials that lose their strength when exposed to high temperatures, such as steel.

SUMMARY

In one aspect, a method of preparing a flame retardant grafted polyolefin resin is provided. The method includes a step of reacting in an extrusion barrel a reactive polyolefin and a monomeric flame retardant agent to form the flame retardant grafted polyolefin resin. The method also includes a step of extruding the flame retardant grafted polyolefin resin. In the method, the reactive polyolefin has a functional group including a moiety selected from the group consisting of anhydrides, epoxies, carboxylic acids, ketones, and isocyanates. The monomeric flame retardant agent has an amine functional group.

In another aspect, a flame retardant grafted polyolefin resin is provided. The resin includes a reactive polyolefin having a functional group including a moiety selected from the group consisting of anhydrides, epoxies, carboxylic acids, ketones, and isocyanates. The resin also includes a monomeric flame retardant agent including an amine group. The monomeric flame retardant agent is grafted to the reactive polyolefin through a reaction between the amine group and the functional group of the reactive polyolefin.

In yet another aspect, a flame retardant cable is provided. The cable includes at least one communication element and a polymeric jacket that surrounds the at least one communication element. The polymeric jacket is formed at least in part from a flame retardant grafted polyolefin resin. The resin is composed of a reactive polyolefin having a first functional group, and a monomeric flame retardant agent have a second functional group. The monomeric flame retardant agent is grafted to the reactive polyolefin through a reaction between the first functional group and the second functional group.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
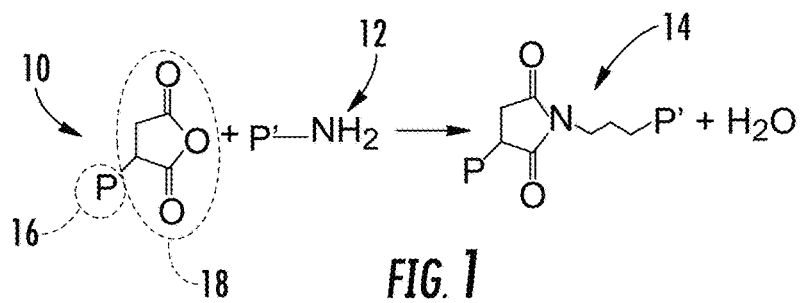
FIG. 1 is a schematic representation of a chemical reaction between a reactive polyolefin and a flame retardant monomeric agent, according to an exemplary embodiment.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of a flame retardant grafted polyolefin resin produced through reactive extrusion are provided. More specifically, the flame retardant grafted polyolefin resins are produced through a reaction between a reactive polyolefin and a monomeric flame retardant agent during an extrusion process. Advantageously, the reactively extruded, flame retardant grafted polyolefin resins improve the compatibility between the polyolefin resin, including additional base resins, and other flame retardant additives such that the mechanical properties of the resultant resin are improved. In embodiments, the flame retardant polyolefin resin can be used for optic fiber cable components (e.g., outer cable jackets, inner cable jackets, binder layers, buffer tubes, etc.).

In embodiments, the flame retardant grafted polyolefin resins are generally composed of two components: (1) a reactive polyolefin containing at least one functional group and (2) at least one monomeric flame retardant that has a chemically reactable site to the functional group (or groups) of the polyolefin. In embodiments, the flame retardant grafted polyolefin resins can further include a resin carrier and/or other additives, including other flame retardant additives. Exemplary resin carriers include, among others, medium-density polyethylene, high-density polyethylene, low-density polyethylene, linear, low-density polyethylene, and polypropylene. The additives can be selected to accomplish a variety of purposes, including enhancing the flame retardant characteristics. Such additives include antioxidants, organic or inorganic flame retardants, and synergists. These components can be separately or jointly compounded using, e.g., a twin screw extruder, so as to create a flame retardant grafted polyolefin resin.

A variety of reactive polyolefins are suitable for use in creating the presently disclosed flame retardant grafted polyolefin resins. The reactive polyolefins include a polymer or copolymer backbone, including at least one reactive functional group. In an embodiment, the amount of reactive functional group (or groups) contained in the reactive polyolefin is from 2 wt % to 49 wt % with the remaining 51 wt % to 98 wt % comprising the olefin repeating units. In another embodiment, the amount of reactive functional group (or groups) contained in the reactive polyolefin is from 2 wt % to 20 wt %, and in a further embodiment, the amount of reactive functional group (or groups) contained in the reactive polyolefin in from 2 wt % to 10 wt %. Examples of the reactive polyolefin include copolymers of olefin/glycidyl methacrylate, olefin/maleic anhydride, olefin/acrylate/glycidyl methacrylate, olefin/acrylate/maleic anhydride, and/or mixtures thereof.

The monomeric flame retardant agent includes a flame retardant source and at least one reactive group. Examples of flame retardant sources include compounds containing at least one of the elements phosphorus, nitrogen, silicon, and/or sulfur. In embodiments, the flame retardant source comprises at least 10 wt % of the monomeric flame retardant agent. In another embodiment, the flame retardant source comprises at least 20 wt % of the monomeric flame retardant agent, and still another embodiment, the flame retardant source comprises at least 30 wt % of the monomeric flame retardant agent. The reactive group is selected to be chemically reactable to the functional group of reactive polyolefin. In embodiments, the monomeric flame retardant agent is a phosphorus-, triazine-, silicon-, and/or sulfur-containing monomer with primary amine functionality. In certain embodiments, the monomer has a primary amine connected directly or in close proximity to an electron donating group. Suitable examples of monomeric flame retardant agents include, but are not limited to, diethyl 4-aminobenzylphosphonate (DABP), 4-aminobutyl phosphonic acid, aminomethanesulfonic acid, and 3-aminopropylsilanetriol.

In embodiments, the reactive polyolefin and monomeric flame retardant agents are selected based on the reactivity of their respective functional groups and reactive groups. For the monomeric flame retardant agent, a primary amine group is highly reactive with a variety of different possible functional groups of the reactive polyolefin, such as anhydride groups, epoxy groups, carboxylic acid groups, ketones, and isocyanate groups. In other embodiments, the functional group for the monomeric flame retardant agent can be an alcohol, hydroxide, carboxylic acid, etc.

Figure 2:
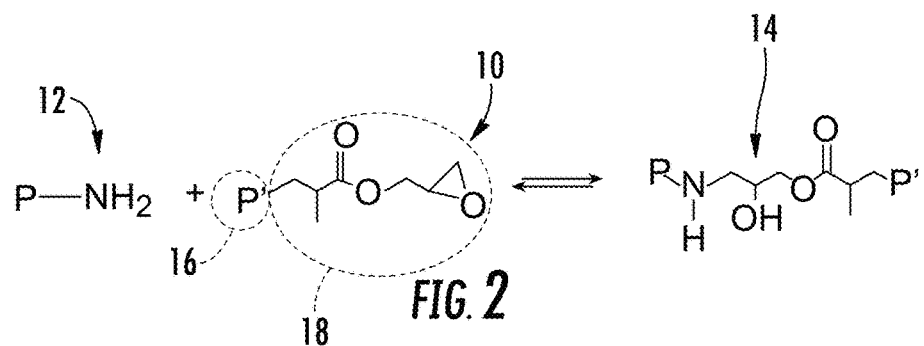
FIG. 2 is a schematic representation of a chemical reaction between another reactive polyolefin and a flame retardant monomeric agent, according to another exemplary embodiment.

Exemplary chemical reactions are provided in FIGS. 1 and 2. In FIG. 1, a reactive polyolefin 10 is reacted with a monomeric flame retardant agent 12 to produce a flame retardant grafted polyolefin resin 14. The reactive polyolefin 10 includes a polyolefin body 16 (designated in shorthand as "P") along with a reactive functional group 18, which in the embodiment shown in FIG. 1 is a maleic anhydride group. The monomeric flame retardant agent 12 is an amine. In another example shown in FIG. 2, the reactive polyolefin 10 includes a polyolefin body 16 (designated as P') with a functional group 18 of glycidyl methacrylate. As can be seen from the reactions depicted in FIGS. 1 and 2, the functional groups of the reactive polyolefin 10 and the monomeric flame retardant agent 12 react so as to graft the monomeric flame retardant agent 12 to the reactive polyolefin 10, thereby producing the flame retardant grafted polyolefin resin 14.

While reactions involving amines and maleic anhydride and glycidyl methacrylate have been depicted, other chemical reactions such as carboxylic acid-amine reactions, ketone-amine reactions, and isocyanate-amine reactions, among others, are possible. In embodiments, the reaction type is selected based on the criterion that a significant reaction conversion, e.g., at least 60%, can be achieved in less than ten minutes (i.e., in an amount of time for the reactive polyolefin and monomeric flame retardant agent to travel through an extrusion barrel of an extruder). In other embodiments, the reaction type is selected such that a reaction conversion of 70% is achieved. In a particular embodiment, the reaction type is selected to achieve more than 80% conversion in less than five minutes. In order to achieve this conversion rate, monomeric flame retardant agents having amines with electron donating group(s), such as 4-aminobutyl phosphonic acid, DABP, etc., are used in a particular embodiment.

In an embodiment, the reaction between the reactive polyolefin and the flame retardant agent to form a polymer resin takes place during polymer extrusion, i.e., the process is a reactive extrusion. In embodiments, extrusion can be performed by a twin screw extruder (with co-rotating or counter rotating screws) or a single screw extruder. In a specific embodiment, the extrusion is performed with a twin screw extruder having intermeshing co-rotating screws.

Figure 3:
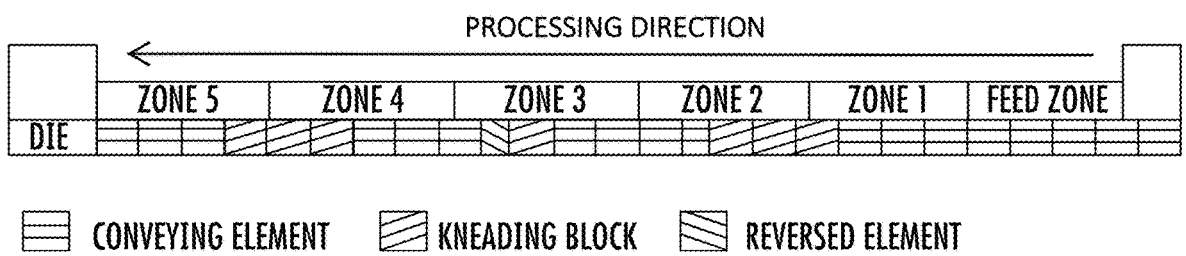
FIG. 3 is a schematic representation of an exemplary setup for a twin screw extruder to perform reactive extrusion, according to an exemplary embodiment.

FIG. 3 provides an exemplary schematic illustration of the zones of a twin screw extruder, specifically a twin screw extruder with intermeshing, co-rotating screws. This exemplary schematic is provided for illustrative purposes only; other screw designs can also be used to create the flame retardant grafted polyolefin resins disclosed herein. As can be seen in the embodiment of FIG. 3, the twin screw extruder includes five zones as well as a feed zone. In embodiments, the extrusion barrel is heated along at least a portion of the length. In specific embodiments, the extrusion barrel is heated above the melting temperature of both the reactive polyolefin and the monomeric flame retardant agent along the entire length of the extrusion barrel.

Referring to the specific embodiment of the extrusion barrel shown in FIG. 3, the feed zone and most of the first zone include only conveying elements. Towards the end of the first zone and for more than half of the second zone, the twin screw extruder includes kneading blocks. The melting and mixing, and thus reacting, process is primarily carried out at least in part in the kneading blocks. The length of the kneading zone can be tailored to adjust the reaction time and mixing characteristics of the reactive polyolefin and the monomeric flame retardant agent used. The remaining portion of the second zone and about half of the third zone contains conveying elements. After the conveying elements in the third zone, a short section of kneading elements are provided followed immediately by a section of reversed elements. The reversed elements can be used to build up back pressure, increase reaction time, and improve mixing. For the remainder of the third zone and for about half of the fourth zone, conveying elements are provided in the twin screw extruder. These elements are followed by a section of kneading elements that extend through the fourth zone and into the fifth zone. Finally, a section of conveying elements is provided through the remainder of the fifth zone to a die at the outlet of the twin screw extruder. The screw configuration is designed to provide enough mixing ability and residence time for reactions between the reactive polyolefin and the monomeric flame retardant agent to occur. In embodiments, a vacuum system with an air trap is provided to remove the unreacted monomers left in the blends.

In order to allow the chemical reaction to occur between the reactive polyolefin and the monomeric flame retardant agent, a residence time of thirty minutes or less in the twin screw extruder is sufficient. In other embodiments, the residence time is less than twenty minutes, and in still other embodiments, the residence time is less than ten minutes. In embodiments, the molar ratio of the reactive polyolefin functional group and the monomer functional group is between 1:2 and 2:1. The process to make the invented materials can be either one step by directly melt-mixing all the ingredients or two steps by first preparing the flame retardant grafted polyolefin resin and then mixing with other components, such as other flame retardants, synergists, additional base resins, typical polymer additives (such as UV stabilizers, colorants, etc.), filler materials, etc.

Some additives, particularly the halogen-free additives used in flame retardant applications, are incompatible with polyolefins and adversely impact the mechanical properties of the resin into which they are included. Advantageously, the flame retardant grafted polyolefin resins disclosed herein have improved compatibility with such additives and may serve as a compatibilizer between the additives and other polymer base resins. Accordingly, embodiments of the flame retardant grafted polyolefin resins disclosed herein can be used in highly filled (e.g., resins containing between 50 wt % and 65 wt % flame retardant additives) and intumescent low-smoke, zero-halogen systems by improving the compatibility between the polymers and the flame retardant additives. Also advantageously, the flame retardant grafted polyolefin resins disclosed herein provide an additional source of nitrogen, carbon, and acid (key components of flame retardant and intumescent systems) while mitigating the degradation of mechanical properties. Thus, in contrast to certain flame retardant materials that, in some circumstances, may result in undesirable properties such as poor compatibility, leaching, and a reduction in mechanical properties, the embodiments disclosed herein provide improved flame retardance and enhance certain mechanical properties of the resultant resin. Further still, the flame retardant grafted polyolefin resins made according to embodiments disclosed herein permit the introduction of new synergists or different synergist combinations along with other flame retardant additives so as to improve the efficacy of the flame retardants.

Moreover, the flame retardant grafted polyolefin resins disclosed herein provide certain synergies to flame retardant systems. For instance, because a flame retardant monomer is introduced to the reactive polyolefin, less flame retardant additives, e.g., ammonium polyphosphate and pentaerythritol (APP/PER), need to be added to the polyolefin resin in order to achieve the same flame retardance. Alternatively, the same amount of flame retardant additives can be added to the polyolefin resin such that better flame retardance can be achieved. Additionally, because a higher elongation is achieved after reactive extrusion, more flame retardant additives can be used while maintaining the elongation properties of the polyolefin resin.

EXAMPLE 1

In one exemplary embodiment, a terpolymer including blocks of ethylene, butyl acrylate, and maleic anhydride was used as the reactive polyolefin. For this terpolymer, the maleic anhydride acts as the reactive functional group. The terpolymer reactive polyolefin included 8 wt % butyl acrylate and 3.1 wt % maleic anhydride with the balance being ethylene (the terpolymer is commercially known as Lotader 3410, Arkema Functional Polyolefins). The monomeric flame retardant agent was diethyl 4-aminobenzylphosphonate (DABP). The terpolymer and DABP were fed into the feeding zone of a co-rotating, twin screw extruder having intermeshing screws (Pharma 11 Twin-screw Extruder, Thermo Scientific) at a feeding rate calibrated to provide 1:1 stoichiometry of the maleic anhydride functional group of the terpolymer and the amine group of the DABP. The processing conditions are shown in Table 1, below. Two samples were prepared with one sample being created at an extrusion barrel temperature of 140° C. and with another sample being created at an extrusion barrel temperature of 160° C.

TABLE 1

Processing Conditions of the DABP-grafting Reactive Extrusions

| Reactive Polyolefin | Monomeric Flame Retardant Agent | Throughput (g/min) | Residence time (s) | Screw Speed (RPM) | Extrusion Barrel Temp. (° C.) | Vacuum (psi) |
|---|---|---|---|---|---|---|
| Ethylene/acrylate/maleic anhydride copolymer | DABP | 5 | 100~270 | 200 | 140 | ~10 |
| Ethylene/acrylate/maleic anhydride copolymer | DABP | 5 | 100~270 | 200 | 160 | ~10 |
| Ethylene/glycidyl methacrylate copolymer | DABP | 5 | 100~270 | 200 | 140 | ~10 |

Upon extrusion the resultant flame retardant grafted polyolefin resins appeared translucent and yellowish, suggesting that the DABP reacted with the terpolymer during the reactive extrusion. Samples from the two extrusions were analyzed using Fourier transform infrared spectroscopy (FTIR). The resulting FTIR spectra demonstrated reduced maleic anhydride peaks, further providing evidence that the maleic anhydride groups of the reactive polyolefin reacted with the amine groups of the DABP. The FTIR spectra were also used to calculate the reaction conversion by comparing the reduction in peak intensity between the samples and the unreacted terpolymer. For the sample created at 160° C., the conversion was approximately 60%, and for the sample created at 140° C., the conversion was approximately 40%.

Figure 4:
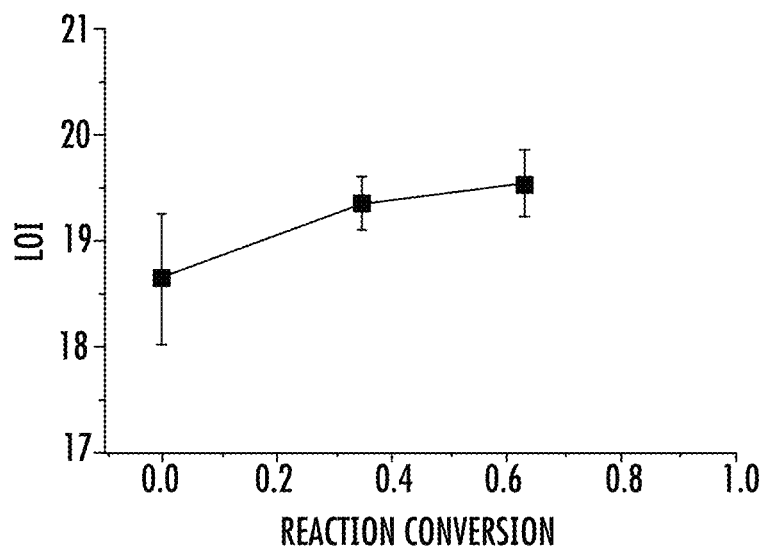
FIG. 4 is a graphical representation of the limiting oxygen index of a flame retardant grafted polyolefin resin as a function of reaction conversion of the reactive polyolefin and the flame retardant monomeric agent, according to an exemplary embodiment.

Samples were also tested for their flame retardance. In particular, the limiting oxygen index (LOI) of the DABP grafted terpolymer samples was measured, and the results are shown in FIG. 4. The LOI increased from 18.5 for the unreacted terpolymer to 19.5 for the DABP grafted terpolymer at 60% conversion. This increase was provided by including only about 0.5 wt % of phosphorus contained in the DABP grafted to the terpolymer. The inventors surmise that the LOI can be further increased either by using a monomeric flame retardant agent with a higher phosphorus content or by using a reactive polyolefin having a higher reactive maleic anhydride content.

Figure 5:
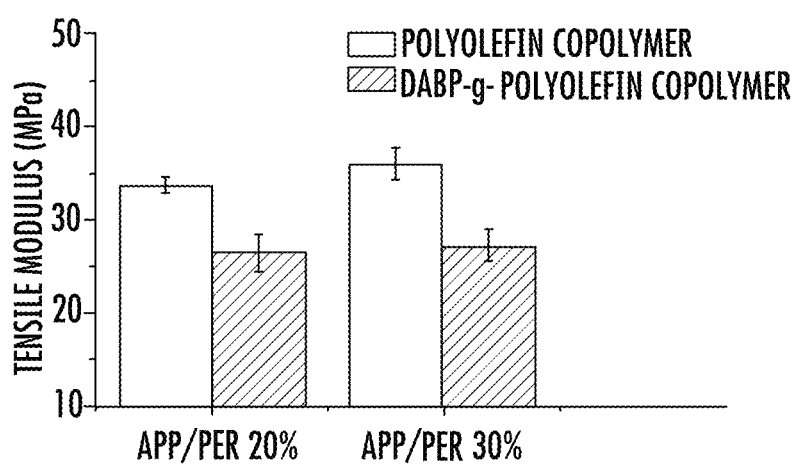
FIG. 5 is a graphical representation of the tensile modulus of a flame retardant grafted polyolefin resin as compared to that of the base resin, according to an exemplary embodiment.
Figure 6:
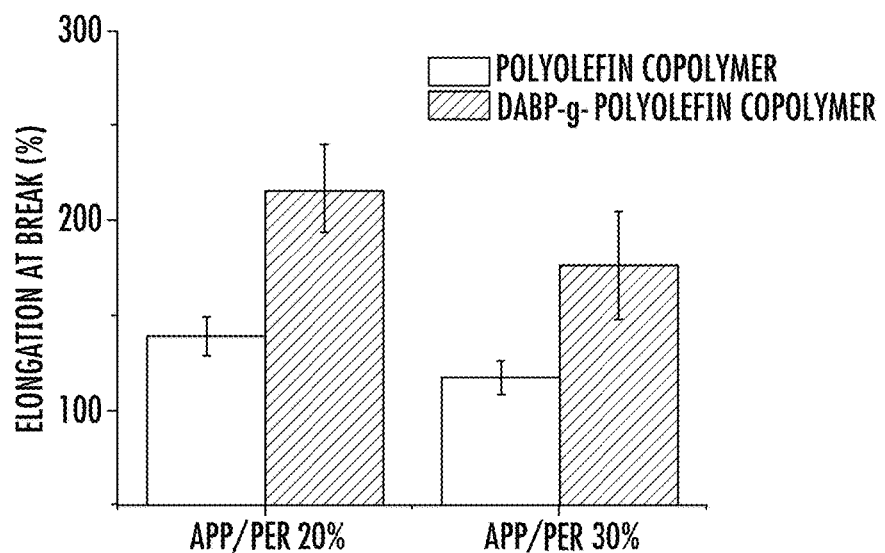
FIG. 6 is a graphical representation of the elongation at break of a flame retardant grafted polyolefin resin as compared to that of the base resin, according to an exemplary embodiment.

Further, samples were tested to determine certain mechanical properties. In particular, the inventors surmised that disclosed flame retardant grafted polyolefin resin had the potential to act as a compatibilizer for other flame retardant additives. Thus, additional samples were prepared using twin screw extrusion that were loaded with 20 wt % and 30 wt % of APP/PER. The APP/PER weight ratio was 2:1. The APP/PER loaded samples were tested to determine the tensile modulus (FIG. 5) and the elongation at break (FIG. 6). As shown in FIGS. 5 and 6, the flame retardant grafted polyolefin resins had only a modest reduction in tensile modulus while providing a significant increase in elongation at break. Specifically, the flame retardant grafted polyolefin resins provided an elongation at break of 220% and 180% for 20 wt % and 30 wt % APP/PER loaded samples, respectively. The inventors attribute this increase in elongation at break to the better compatibility between the DABP grafted terpolymer and the APP/PER flame retardants.

EXAMPLE 2

In another exemplary embodiment, an ethylene/glycidyl methacrylate block copolymer was used as the reactive polyolefin. DABP was used as the monomeric flame retardant agent. The reactive polyolefin had a glycidyl methacrylate content of 8.0 wt % (the block copolymer is commercially known as Lotader AX8840, Arkema Functional Polyolefins). The block copolymer and DABP were fed into the feeding zone of the co-rotating, twin screw extruder having intermeshing screws (Pharma 11 Twin-screw Extruder, Thermo Scientific) at a feeding rate calibrated to provide 1:1 stoichiometry of the glycidyl methacrylate functional group of the block copolymer and the amine group from the DABP. The processing conditions are shown in Table 2, above.

The resultant samples appeared cloudy white initially but became yellowish after storing at room temperature for a week, suggesting that the reaction did not completely finish during reactive extrusion. FTIR was performed on the samples, and peaks corresponding to primary amines (unreacted DABP) and secondary amines (reacted DABP) were both present in the as-extruded samples. Thus, flame retardant grafted polyolefin resins derived from a reaction between glycidyl methacrylate and amine reactions can be allowed to age to achieve the desired conversion, or an accelerator can be provided to achieve a higher reaction conversion. Some examples of suitable accelerators include tertiary amines, alcohols, and phenols.

Figure 7:
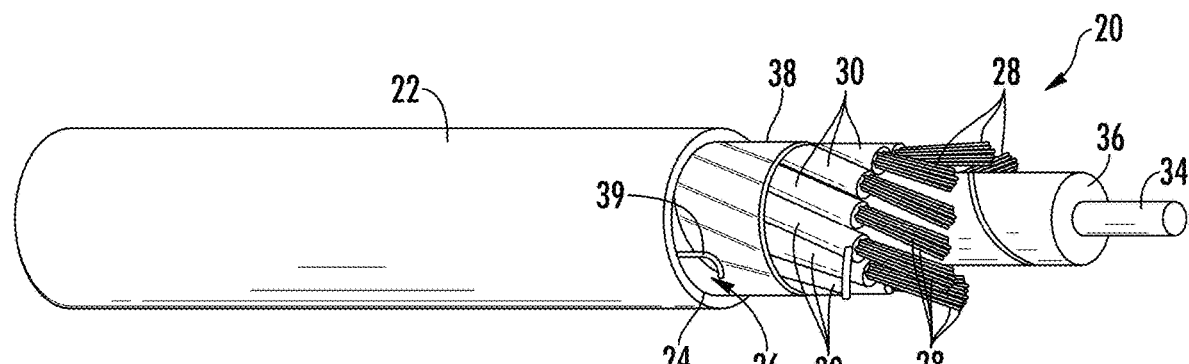
FIG. 7 is an illustration of an optic fiber cable in which components of the cable include the flame retardant grafted polyolefin resin, according to an exemplary embodiment.

The improved flame retardance and mechanical properties of the disclosed flame retardant grafted polyolefin resin can be applied in a variety of contexts. In a particular embodiment shown in FIG. 7, the flame retardant grafted polyolefin resin is used as a jacket for a cable or cable component. The cable shown in FIG. 7 is a fiber optic cable 20. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the flame retardant grafted polyolefin resin is incorporated into the cable jacket 22 of fiber optic cable 20. In another embodiment, the flame retardant grafted polyolefin resin is incorporated into the buffer tubes 30 surrounding the bundles of optical fibers 28. In a further embodiment, the flame retardant grafted polyolefin resin is incorporated into the water barrier 38. By surrounding the cable and cable components with the flame retardant grafted polyolefin resin, the ability of fire to spread along cable 20 is reduced, and the amount of smoke produced by cable 20 during fire exposure is reduced.

The inventors envision that the flame retardant grafted polyolefin resin discussed above will meet certain flame retardant standards, such as cone calorimeter reaction-to-fire test ISO 5660; limiting oxygen index (LOI) test ISO 4589; single cable test IEC 60332-1-2; vertical multi cable test DIN 50399/IEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of preparing a flame retardant grafted polyolefin resin, the method comprising the steps of:
    reacting in an extrusion barrel a reactive polyolefin and a monomeric flame retardant agent to form the flame retardant grafted polyolefin resin, wherein the reactive polyolefin has a functional group including a moiety selected from the group consisting of anhydrides, epoxies, carboxylic acids, ketones, and isocyanates and wherein the monomeric flame retardant agent has an amine functional group and contains at least one element selected from the group consisting of phosphorus, nitrogen, silicon, and sulfur, the at least one element comprising more than 10% by weight of the monomeric flame retardant agent; and extruding the flame retardant grafted polyolefin resin.

2. The method of claim 1, wherein the reactive polyolefin is a copolymer selected from the group consisting of olefin/glycidyl methacrylate, olefin/maleic anhydride, olefin/acrylate/glycidyl methacrylate, olefin/acrylate/maleic anhydride, and combinations thereof.

3. The method of claim 1, wherein the at least one element comprises more than 30% by weight of the monomeric flame retardant agent.

4. The method of claim 1, wherein the amine functional group is a primary amine functional group.

5. The method of claim 1, wherein the reactive polyolefin comprises from 51 wt % to 98 wt % of olefin repeating units.

6. The method of claim 1, wherein the reactive polyolefin comprises from 2 wt % to 49 wt % of functional group repeating units.

7. The method of claim 6, wherein the reactive polyolefin comprises from 2 wt % to 20 wt % of functional group repeating units.

8. The method of claim 1, wherein the steps of reacting and extruding are performed in the extrusion barrel of a twin screw extruder.

9. The method of claim 8, wherein, during the reacting step, the reactive polyolefin and the monomeric flame retardant agent resides in the extrusion barrel for a time of 30 minutes or less.

10. The method of claim 9, wherein the reacting step is performed at a temperature of 140° C. or higher.

11. The method of claim 9, wherein the reacting step achieves a conversion of at least 60%.

12. The method of claim 1, wherein the functional group of the reactive olefin and the monomeric flame retardant agent are provided to the extrusion barrel in a molar ratio of between 1:2 and 2:1.

13. A flame retardant grafted polyolefin resin, comprising:
a reactive polyolefin having a functional group including a moiety selected from the group consisting of anhydrides, epoxies, carboxylic acids, ketones, and isocyanates; and
a monomeric flame retardant agent including an amine group and containing at least one element selected from the group consisting of phosphorus, nitrogen, silicon, and sulfur, the at least one element comprising more than 10% by weight of the monomeric flame retardant agent;
wherein the monomeric flame retardant agent is grafted to the reactive polyolefin through a reaction between the amine group and the functional group of the reactive polyolefin.

14. The flame retardant compound of claim 13, wherein the reactive polyolefin is a copolymer selected from the group consisting of olefin/glycidyl methacrylate, olefin/maleic anhydride, olefin/acrylate/glycidyl methacrylate, olefin/acrylate/maleic anhydride, and mixtures thereof.

15. The flame retardant compound of claim 13, wherein amine functional group is a primary amine functional group.

16. The flame retardant compound of claim 13, wherein the reactive polyolefin comprises from 2 wt % to 49 wt % of functional group repeating units.

17. A flame retardant cable comprising:
at least one communication element;
a polymeric jacket that surrounds the at least one communication element;
wherein the polymeric jacket is formed at least in part from a flame retardant grafted polyolefin resin comprising:
a reactive polyolefin having a first functional group; and
a monomeric flame retardant agent have a second functional group;
wherein the monomeric flame retardant agent is grafted to the reactive polyolefin through a reaction between the first functional group and the second functional group.

18. The flame retardant cable of claim 17, wherein the at least one communication element comprises an optical fiber.

19. The flame retardant cable of claim 17, wherein the first functional group includes a moiety selected from the group consisting of anhydrides, epoxies, carboxylic acids, ketones, and isocyanates.

20. The flame retardant cable of claim 17, wherein the monomeric flame retardant is comprised of at least 10% by weight of a at least one element selected from the group consisting of phosphorus, nitrogen, silicon, and sulfur.

21. The flame retardant cable of claim 17, wherein the second functional group includes an amine.

* * * * *